Dec. 29, 1925.
A. MAREK
1,567,969
INSECT EXTERMINATOR
Filed April 15, 1925    2 Sheets-Sheet 1
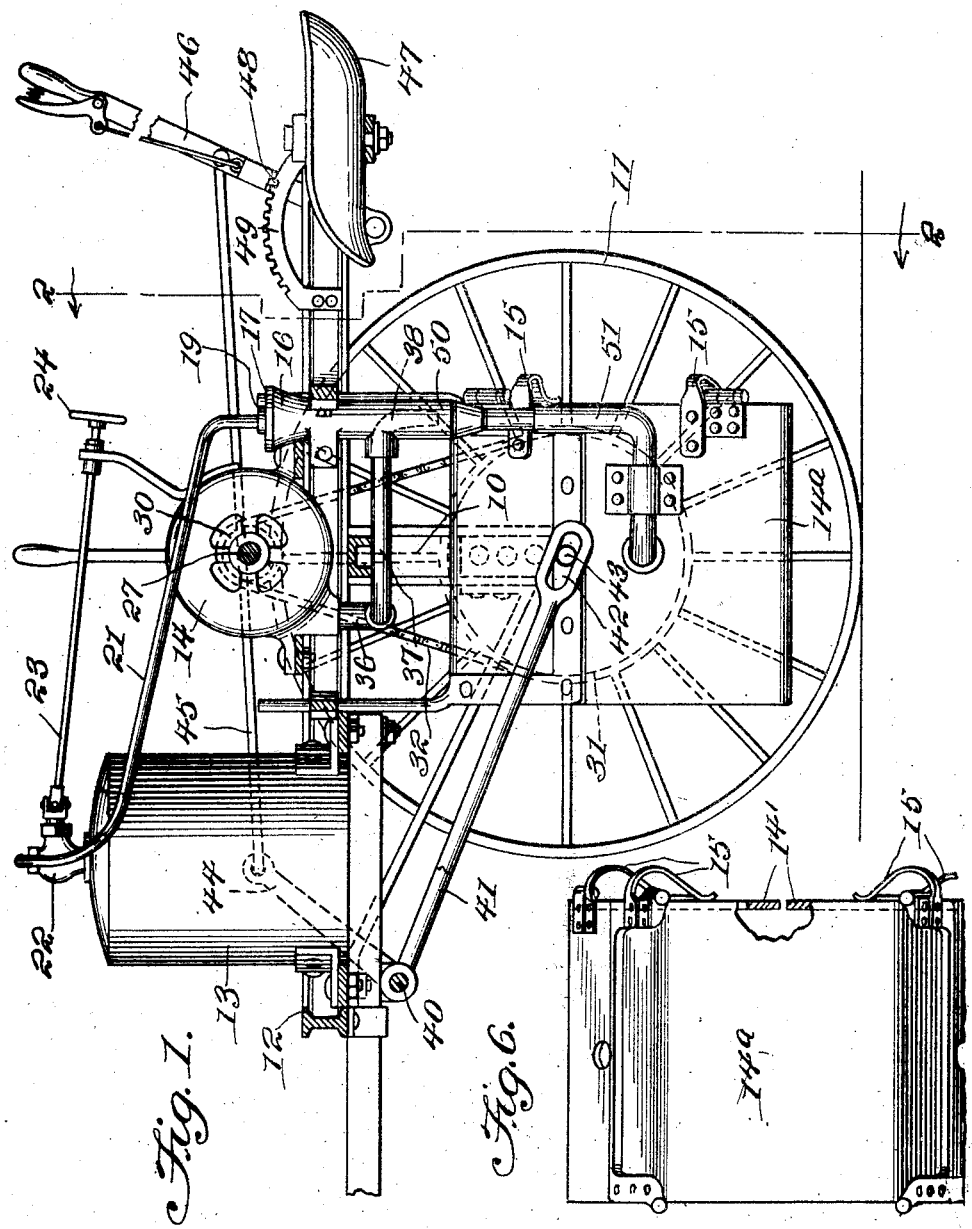

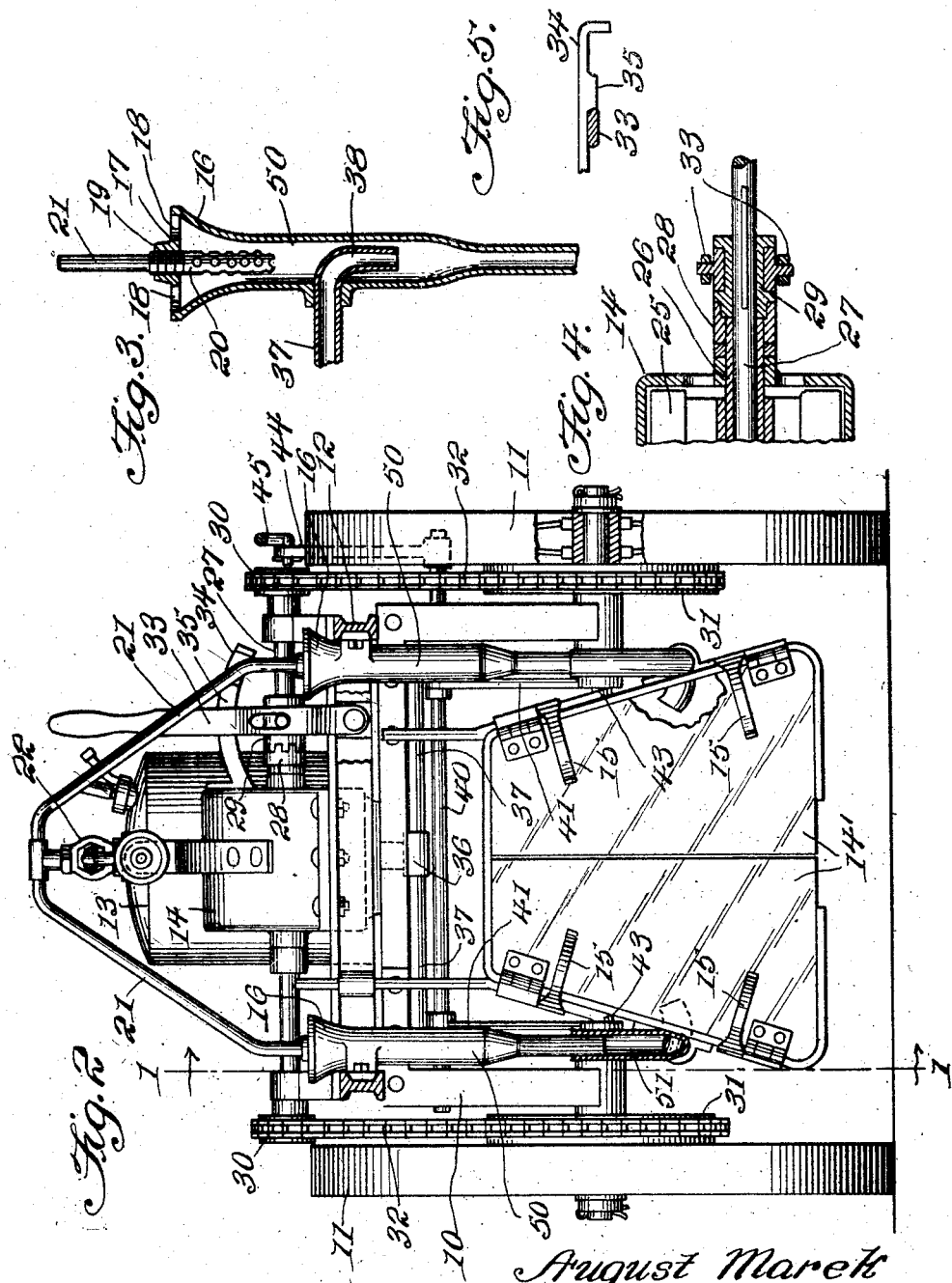

Patented Dec. 29, 1925.

1,567,969

UNITED STATES PATENT OFFICE.

AUGUST MAREK, OF YOAKUM, TEXAS.

INSECT EXTERMINATOR.

Application filed April 15, 1925. Serial No. 23,387.

*To all whom it may concern:*

Be it known that I, AUGUST MAREK, a citizen of the United States, residing at Yoakum, in the county of Lavaca and State of Texas, have invented new and useful Improvements in Insect Exterminators, of which the following is a specification.

This invention relates to insect destroyers, and contemplates the provision of a machine adapted to move over the ground or surface, supporting a plant receiving frame into which hot air is admitted for the purpose of spraying the plant to kill boll weevils or other insects about the plant.

More specifically stated, the invention provides a machine adapted to be moved over a row of plants, each plant being received by a frame supported by the machine, the frame having associated therewith tubes through which hot air is forced against the plant, the air being heated by a burner arranged within the tube, the flame of which is drawn through the tube by means of an injector, whereby the hot air is forced against the plant with considerable pressure, and is of sufficient intensity to destroy the insects.

Another object of the invention resides in providing the plant receiving frame with a pair of pivoted doors, normally maintained in a closed position through the instrumentality of springs and adapted to be opened by striking against the plant which tends to knock the insects off the plant, and which doors are further utilized to retain the heat within the frame.

In carrying out the invention, I also contemplate a novel construction of means for adjusting the frame and the hot air tubes toward and away from the ground, so that these parts can be arranged at the proper height to meet the requirements of any and all conditions.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view taken on line 1—1 of Figure 2.

Figure 2 is a sectional view taken on line 2—2 of Figure 1.

Figure 3 is a sectional view through one of the hot air tubes showing how the burner and injector is associated therewith.

Figure 4 is a sectional view through the fan and clutch therefor.

Figure 5 is a detail sectional view of the clutch lever, and retaining arm therefor.

Figure 6 is a detail view partly in section of the plant receiving frame.

The machine forming the subject matter of the present invention comprises an arched shaped frame 10 which includes the ground wheels 11, while arranged upon the frame 10 is a frame like structure 12 which supports a gas tank 13 and a fan casing 14.

Attached to and depending from the arched shaped frame 10 is what I term a plant receiving frame 14$^a$ which may vary in size and configuration, but which is preferably of the design outlined in Figure 2. This frame includes a top, divergent sides, the ends of which extend inwardly in a horizontal plane, being spaced apart a sufficient distance to receive the plant for the purpose to be hereinafter described. Arranged at both sides of this plant receiving frame are hot air tubes which may be supported in any suitable manner but which have their lower ends projecting inwardly through the openings in the adjacent sides of the frame 14$^a$ as shown in Figure 2. The upper portion of the tubes are enlarged and flare outwardly as at 16, being provided with a cover 17 which has air receiving openings 18 as clearly shown in Figure 3, the cover being also formed with a boss 19 to threadedly accommodate the burner 20. The burner 20 projects an appreciable distance within the tube, and may be of any desired construction. It is of course one burner in each tube, and coupled with each burner is a fuel supply pipe 21, which pipes have their adjacent ends suitably coupled with a valve casing 22 which is associated with the fuel tank 13. The valve within the casing 22 is connected with a rod 23 one end of which supports a hand wheel 24 arranged within convenient reach of the operator, so that the said valve can be opened or closed to regulate the admittance of fuel to the burner 20.

It will be noted that the plant receiving frame is provided with a pair of swinging doors 14' arranged at the rear, and which doors are normally held closed by means of suitable springs 15. These doors are utilized to retain the heat within the frame as will be readily understood, while in addition to this fact it is obvious that as the frame moves away from each plant, the latter strikes the doors to open the latter against the tension of the springs 15, and the doors thus utilized to knock the insects off the plants onto the ground.

The fan casing 14 is arranged upon the frame 12 in juxta-position to the fuel tank 13 and arranged to operate within the casing 14 is a fan indicated at 25. As shown in Figure 4, the fan is mounted upon a sleeve 26 which rotates upon the shaft 27, the sleeve projecting beyond one end of the casing 14 and provided with a clutch member 28 adapted to cooperate with a sliding clutch member 29 which is keyed upon the shaft 27. This shaft is arranged transversely of the supporting frame 12 and supports belt pulleys 20 adjacent each end thereof, and over each of these pulleys, and a larger pulley 31 supported upon the hub of the adjacent ground wheel 11 is an endless belt 32. Manifestly, when the machine is in motion, rotation from the ground wheels 11 is imparted to the shaft 27, and when the clutch members 28 and 29 respectively are engaged, the fan 25 is operated. The clutch is controlled by means of a suitable lever 33, and is held in a given position by means of a resilient arm 34 provided with a projection 35 adapted to engage either longitudinal edge of the lever 33. Depending from the fan casing is a short pipe 36 which includes oppositely extending branches 37 there being one branch for each air tube, and these branches enter the tubes 16 and terminate to provide depending nipples 38 which are used similar to the injectors. In other words, when the fan 25 is in operation, it forces air through the pipes 37 into the tubes 15 with sufficient force to create a suction through the tubes, thereby drawing the flame from the burners 20 downwardly through the tubes to heat the air passing through the pipe 37, and also the air drawing through the tubes through the openings 18 at the top thereof. This air which is intensely heated is projected or sprayed against the plants to destroy insects thereabout.

In practice, the machine is moved over a row of plants, and the frame 14ª is designed to receive each plant in order. As soon as the frame 14ª passes over a particular plant, by operating the lever 33 and the hand wheel 24, fuel can be conveyed to the burners 20, and air injected into the tubes 15, and heated by the flame from the burners in the manner above described. The hot air is forcibly projected against the plants, and the heat of the air is so intense that it will destroy or kill any insects with which it comes in contact. The operation of the fan is as above stated controlled by the clutch lever 33, so that it can be operated only when desired.

In order that the machine may be used with plants of different size, I provide for the adjustment of the plant receiving frame 14ª toward and away from the ground. For this purpose, I employ yokes the cross member of which is indicated at 45 and the parallel members or side members have their corresponding forward extremities slotted as at 42 to receive a pin 43 carried by the adjacent side of the frame to support the latter. This yoke is mounted for rocking movement, so that when it is elevated the frame is lifted away from the ground, and of course when the yoke is lowered, said frame is adjusted toward the ground. Fixed to the transverse member 40 of the yoke is a lever 44 which is terminally connected with the adjacent end of a rod 45, the other end of which is connected with a manually operable lever 46 arranged adjacent the operator's seat indicated at 47, so that the frame 14 can be conveniently moved toward or away from the ground as the occasion may require. The said frame is held in its adjusted position by means of the pawls 48 carried by the lever 46 cooperating with the ratchet 49 as clearly shown. As hereinabove stated, the hot air tubes extend into the sides of the plant receiving frame for the purpose mentioned, and consequently in order to effect an adjustment of the frame in the manner described it is necessary to make each tube adjustable. Therefore each of these tubes include telescopical sections indicated at 50 and 51 respectively, the latter being carried by the frame 14 and slidably receiving the sections 50.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A machine of the character described comprising a wheeled frame, a plant receiving frame depending therefrom and designed to receive the plants of a row singly, as the machine passes over said row, said second mentioned frame being open at the front, a pair of swinging doors arranged at the rear of said frame and adapted to be opened by the plants, resilient means for normally holding said doors closed, means for spraying each plant with hot air to destroy the insects thereon as the frame passes over said plants.

2. A machine of the character described comprising a wheeled frame, a plant receiving frame depending therefrom and designed to receive the plants as the machine passes over a row of plants, air tubes supported by the second mentioned frame and designed to direct sprays of hot air within the frame, and means for heating the air passing through the tubes 3. A machine of the character described comprising a wheeled frame adapted to pass over a row of plants, a plant receiving frame depending therefrom, air tubes supported by the second mentioned frame and having their lower extremities extended inwardly to direct the air within the frame, an injector tube associated with each air tube, and means for heating the air within each tube for the purpose specified.

4. A machine of the character described comprising a wheeled frame, adapted to pass over a row of plants, a plant receiving frame depending therefrom, air tubes supported by the second mentioned frame and designed to direct the air against each plant received by said frame, each tube being open at its upper end, means for injecting air within each tube, and means for heating the air passing through the tube as and for the purpose specified.

5. A machine of the character described comprising a wheeled frame adapted to pass over a row of plants, a plant receiving frame depending therefrom, air tubes supported by said frame and designed to direct air againt each plant as it is received by said frame, a burner arranged within each tube for heating the air that passes therethrough, and an injector pipe arranged within each tube whereby the flame from the burner is drawn through the tube to heat the air in the manner and for the purpose specified.

6. A machine of the character described comprising a wheeled frame adapted to pass over a row of plants, a plant receiving frame depending therefrom, air tubes supported on the second mentioned frame and designed to direct air against each plant as it is received by said frame, a burner arranged in the upper end of each tube, a fuel tank supported by the wheeled frame, supply pipes leading from the tank to said burner, a valve controlling the supply of fuel through the burners, and means for injecting air within each tube in a manner to draw the flame from each burner downwardly through the adjacent tube to heat the air in the manner and for the purpose specified.

7. A machine of the character described comprising a wheeled frame, a plant receiving frame depending therefrom, air tubes supported by the second mentioned frame and designed to direct air against each plant as it is received by said frame, a burner in the upper end of each tube, a fuel supply tank supported by the wheeled frame, and having valve controlled communication witn said burners, a fan casing supported on the said frame, a fan operating within the casing, pipes leading from the fan casing and entering said tubes to inject air thereinto in a manner whereby the flame from each burner is drawn downwardly through the tube to heat the air therein in the manner and for the purpose specified, means for operating the fan from the wheels of the machine, and said means including a manually controlled clutch.

In testimony whereof I affix my signature.

AUGUST MAREK.